United States Patent
Madasu et al.

(10) Patent No.: US 11,493,664 B2
(45) Date of Patent: Nov. 8, 2022

(54) MULTI-OBJECTIVE COMPLETION PARAMETERS OPTIMIZATION FOR A WELLBORE USING BAYESIAN OPTIMIZATION

(71) Applicant: LANDMARK GRAPHICS CORPORATION, Houston, TX (US)

(72) Inventors: Srinath Madasu, Houston, TX (US); Hanife Meftun Erdogan, Houston, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 150 days.

(21) Appl. No.: 16/640,300

(22) PCT Filed: Mar. 4, 2019

(86) PCT No.: PCT/US2019/020614
§ 371 (c)(1),
(2) Date: Feb. 19, 2020

(87) PCT Pub. No.: WO2020/180295
PCT Pub. Date: Sep. 10, 2020

(65) Prior Publication Data
US 2020/0284944 A1     Sep. 10, 2020

(51) Int. Cl.
*G06N 3/08* (2006.01)
*E21B 43/11* (2006.01)
(Continued)

(52) U.S. Cl.
CPC .......... *G01V 99/005* (2013.01); *E21B 43/11* (2013.01); *E21B 43/26* (2013.01); *E21B 49/00* (2013.01);
(Continued)

(58) Field of Classification Search
CPC .......... G01V 99/005; G01V 1/40; G06N 3/08; G06N 3/0445; G06N 3/0454; G06N 5/04;
(Continued)

(56) References Cited

U.S. PATENT DOCUMENTS 9,745,833 B2 *   8/2017   Carvajal ................. E21B 43/00
2012/0253770 A1  10/2012   Stern et al.
(Continued)

FOREIGN PATENT DOCUMENTS

WO     2014039036 A1     3/2014
WO     2014183022 A1    11/2014

OTHER PUBLICATIONS

Anand et al., A Methodology for Assisted History Match-Application to an EOR Pilot in Middle East, Mar. 21-23, 2016, SPE EOR Conference at Oil and Gas West Asia, Muscat, Oman, 22 pp. (Year: 2016).*

(Continued)

*Primary Examiner* — Toan M Le
(74) *Attorney, Agent, or Firm* — Kilpatrick Townsend & Stockton LLP (57) ABSTRACT

A system for determining completion parameters for a wellbore includes a sensor and a computing device. The sensor can be positioned at a surface of a wellbore to detect data prior to finishing a completion stage for the wellbore. The computing device can receive the data, perform a history match for simulation and production using the sensor data and historical data, generate inferred data for completion parameters using the historical data identified during the history match, predict stimulated area and production by inputting the inferred data into a neural network model, determine completion parameters for the wellbore using Bayesian optimization on the stimulated area and production from the neural network model, profit maximization, and (Continued)

output the completion parameters for determining completion decisions for the wellbore.

19 Claims, 7 Drawing Sheets (51) Int. Cl.
*G01V 99/00* (2009.01)
*G06N 5/04* (2006.01)
*E21B 43/26* (2006.01)
*E21B 49/00* (2006.01)
*G01V 1/40* (2006.01)

(52) U.S. Cl.
CPC .............. *G01V 1/40* (2013.01); *G06N 3/08* (2013.01); *G06N 5/04* (2013.01)

(58) Field of Classification Search
CPC ......... G06N 7/005; E21B 43/26; E21B 43/11; E21B 43/00; E21B 41/00; E21B 49/00; E21B 2200/22
See application file for complete search history.

(56) References Cited

U.S. PATENT DOCUMENTS

2014/0334261 A1 11/2014 Abel et al.
2019/0025461 A1 1/2019 Wiener et al.

OTHER PUBLICATIONS

Bravo et al., Applying Analytics to Production Workflows: Transforming Integrated Operations into Intelligent Operations, Apr. 1-3, 2014, SPE Intelligent Energy Conference and Exhibition, Utrecht, The Netherlands, 11 pp. (Year: 2014).*
Berkenkamp, et al., "Bayesian Optimization with Safety Constraints: Safe and Automatic Parameter Tuning in Robotics", Mar. 2, 2018, pp. 1-22.
PCT/US2019/020614, "International Search Report and Written Opinion", dated Dec. 3, 2019, 11 pages.
Snoek, et al., "Scalable Bayesian Optimization Using Deep Neural Networks", Jul. 13, 2015, pp. 1-13.

* cited by examiner

MULTI-OBJECTIVE COMPLETION PARAMETERS OPTIMIZATION FOR A WELLBORE USING BAYESIAN OPTIMIZATION

TECHNICAL FIELD

The present disclosure relates generally to completing wellbores for production. More specifically, but not by way of limitation, this disclosure relates to determining parameters for the completion stage of a wellbore.

BACKGROUND

A well such as an oil or gas well can include a wellbore drilled through a subterranean formation. Prior to producing oil or gas from the wellbore, the wellbore is completed using tools and other systems to prepare the wellbore for production. Examples of completion activities include perforating a casing, performing a hydraulic fracturing operation, running tools downhole to control production, etc. Determining completion parameters for desired or optimum production can be challenging as environments within the wellbore may not be completely known or may change over time. Changing the completion parameters subsequent to beginning production can be difficult and in some cases impossible.

DETAILED DESCRIPTION

Certain aspects and features of the present disclosure relate to optimizing the completion of a well by using a neural network to predict stimulation, production, and well cost that is used to determine the tools and processes to optimally complete the well. The completion parameters can be predicted based on Bayesian optimization. Examples of completion parameters include cluster spacing, number of perforations, proppant conductivity, perforation diameter, among others. The parameters can be used to plan and execute the completion stage of a wellbore. In some examples, the completion parameters can be used to plan an entire completion workflow that can result in higher hydrocarbon production yield per well.

The well cost can be based on the data generated from physics-based models. The physics-based models can determine the model parameters through history matching. For example, history matching for stimulation can include matching the surface pressure, and for the production matching the production history data. The models can be used to generate the data for a neural network model used for the optimization. Instead of using numerical methods such as finite element or finite difference to solve a spatial-temporal partial differential equation, a neural network framework can be used to model the stimulation and production of a well. The physics-based models can be combined with the data during a history-matching process and the data can be generated from the physics-based models for neural network models. By coupling the stimulation, production, and cost minimization, an optimal completion for a wellbore can be achieved faster and more accurately.

In some examples a Bayesian optimization-based neural network algorithm, or other machine-learning subsystem, can be used to model stimulation and production with optimal completion parameters determined for completion. The models considered for data generation can be physics-based models, and the generated data is modeled in the framework of the neural network or other machine-learning subsystem. Data generation for the simulated area can be a function of fracture geometry, fracture porosity, permeability, proppant mass, conductivity, fluid volume, fracture spacing, stage spacing, perforation diameter, and number of perforations. The production can also be a function of these parameters. The parameters can be shared between the stimulation and production, but other model parameters can be varied to history match. Once the models are determined, data can be generated and a neural network model (or model in another machine-learning system) can be built for Bayesian optimization. Bayesian optimization can be used to determine the optimum completion parameters. A wellbore can be completed using the completion parameters.

An example of the machine-learning subsystem is a deep neural network (DNN) or other long short-term memory (LSTM) machine-learning algorithm that can use the data from sensors or other sources to determine, using Bayesian optimization, optimum completion parameters.

Illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
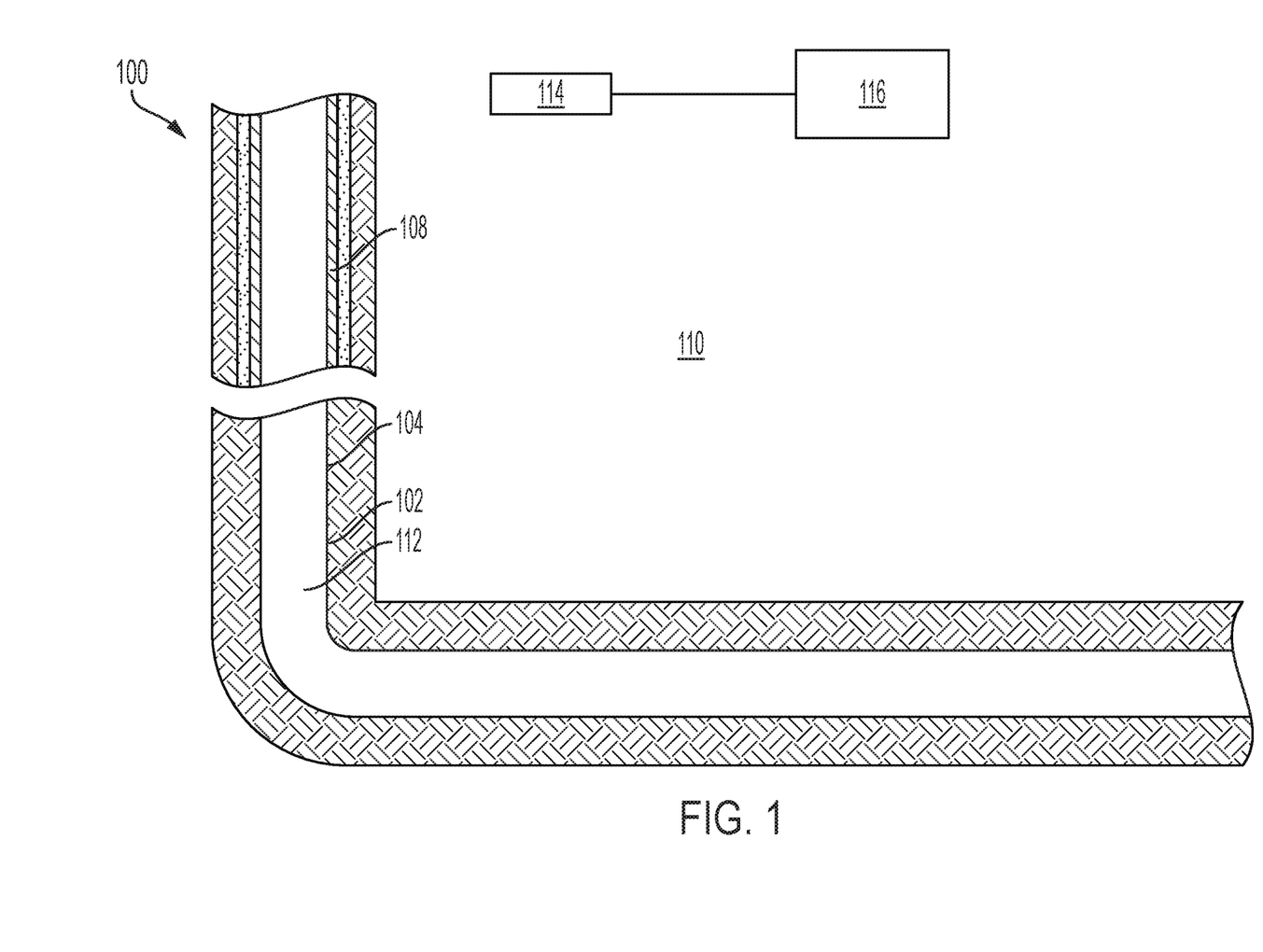
FIG. 1 is a cross-sectional side view of an example of a well prior to completion and production, according to some aspects.

FIG. 1 is a cross-sectional side view of an example of a well 100 prior to completion and production, according to some aspects. The well 100 includes a wellbore 102 extending through various earth strata of a subterranean formation 110 and defining an inner area 112 of the wellbore 102. In this example, the wellbore 102 has a substantially vertical section 104 and a substantially horizontal section 106. The substantially vertical section 104 may include a casing string 108 cemented at an upper portion of the substantially vertical section 104.

Prior to production, the wellbore 102 can be completed. For example, a tubing string can be ran downhole to extend from the well's surface to within wellbore 102. The tubing string can provide a conduit for fluid (e.g., production fluid) to travel from the substantially horizontal section 106 to the well's surface. The tubing string can include production tubular sections at various production intervals adjacent to the subterranean formation 110. Packers can be positioned on the left and right sides of production tubular sections to define production intervals and provide fluid seals between the tubing string and the wall of the wellbore 102.

The production tubular sections can include inflow control devices. An inflow control device can control the volume or composition of the fluid flowing from a production interval into a production tubular section. And a hydraulic fracturing operation may be performed from the wellbore 102 to the formation 110.

At the surface of the wellbore is a sensor 114 that can detect stimulation data and production data for the wellbore 102 and the formation 110. Examples of stimulation data include positional and size information about fractures and the creation of those fractures. Examples of production data include the amount of oil, pressure, and other attributes about the potential production of oil or gas from the formation 110. Although one sensor 114 is depicted, more than one sensor can be used. The sensor 114 may be a surface sensor, such as a seismic sensor, to detect and collect data. A computing device 116 can receive data from the sensor 114, process the data, and control completion equipment or indicate which equipment to use to optimize completion parameters. The computing device 116 can be positioned at the surface of the wellbore or at a remote site.

Figure 2:
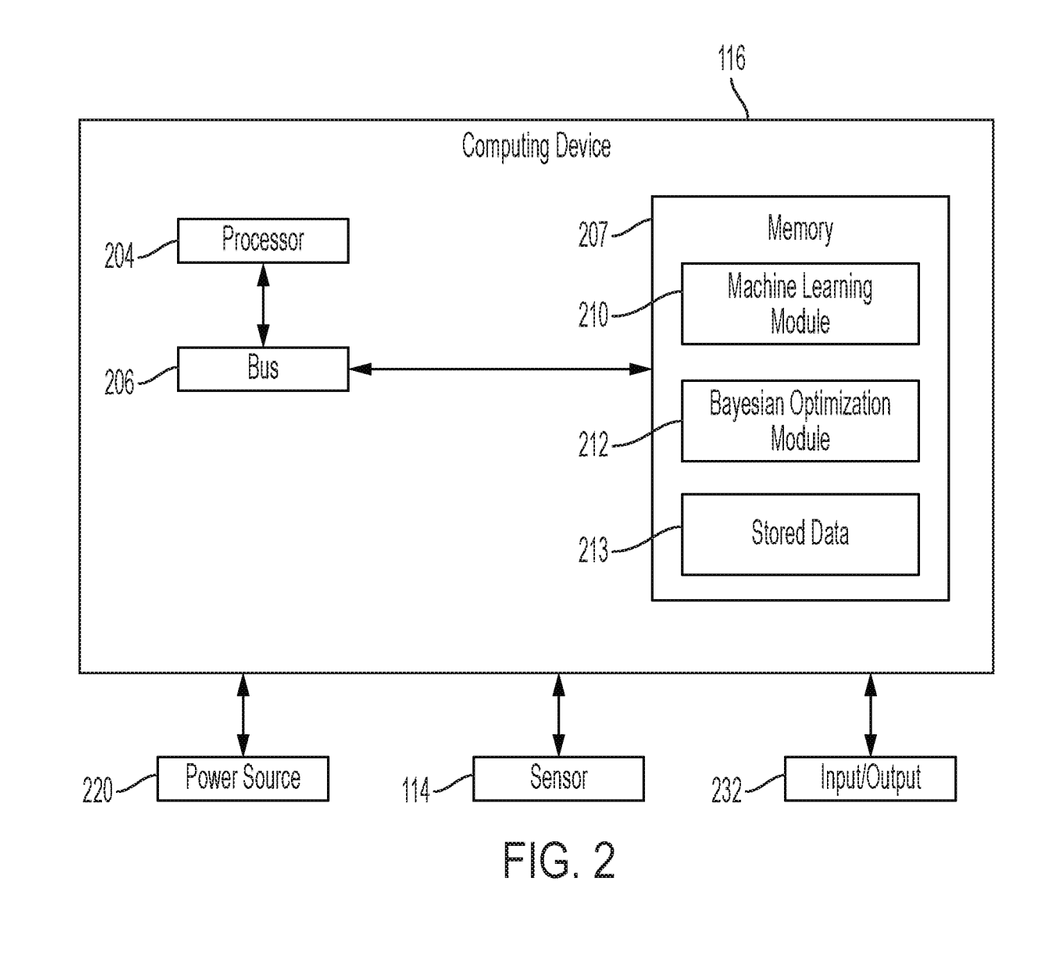
FIG. 2 is a block diagram of an example of a system for optimizing completion parameters according to some aspects.

FIG. 2 is a block diagram of an example of a system for optimizing completion parameters according to some aspects. In some examples, the components shown in FIG. 2 (e.g., the computing device 116 and power source 220 can be integrated into a single structure. For example, the components can be within a single housing. In other examples, the components shown in FIG. 2 can be distributed (e.g., in separate housings) and in electrical communication with each other.

The system includes the computing device 116. The computing device 116 can include a processor 204, a memory 207, and a bus 206. The processor 204 can execute one or more operations for obtaining data associated with the wellbore and outputting optimized completion parameters for completing the wellbore. The processor 204 can execute instructions stored in the memory 207 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 include electrically erasable and programmable read-only memory ("EEPROM"), flash memory, or any other type of non-volatile memory. In some examples, at least some of the memory 207 can include a non-transitory medium from which the processor 204 can read instructions. A non-transitory computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions, such as a machine-learning module 210, for executing a neural network or other type of long-short term memory (LSTM) machine-learning module. The instructions can be executed for building the machine-learning module 210 and predict stimulated and production parameters. A Bayesian optimization module 212 can be executed by the processor 204 to maximize the stimulated area, production, and cost to output optimal completion parameters. In some examples, the memory 207 can include stored data 213, such data from sensor 114 and optimal completion parameters.

The system can include a power source 220. The power source 220 can be in electrical communication with the computing device 116. In some examples, the power source 220 can include a battery or an electrical cable (e.g., a wireline). In some examples, the power source 220 can include an AC signal generator. The system in this example also includes input/output interface 232. Input/output interface 232 can connect to a keyboard, pointing device, display, and other computer input/output devices. An operator may provide input using the input/output interface 232. All or portions of input/output interface 232 may be located either locally or remotely relative to the rest of system.

Figure 3:
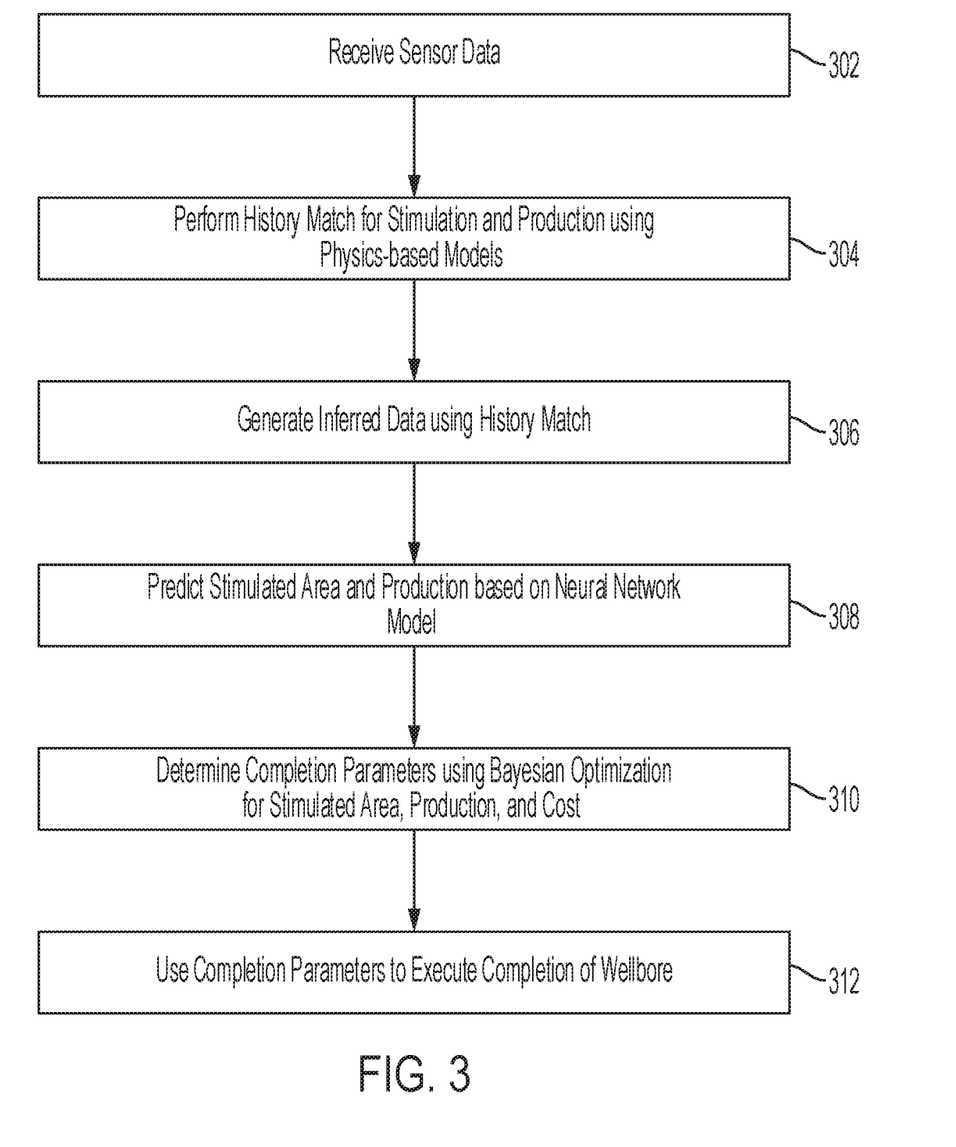
FIG. 3 is an example of a flowchart of a process for determining completion parameters for a wellbore using a machine-learning module and a Bayesian optimization module according to some aspects of the present disclosure.

FIG. 3 is an example of a flowchart of a process for determining completion parameters for a wellbore using a machine-learning module and a Bayesian optimization module according to some aspects of the present disclosure. Some examples can include more, fewer, or different blocks than those shown in FIG. 3. The blocks shown in FIG. 3 can be implemented using, for example, the computing device illustrated in FIG. 1 and FIG. 2.

In block 302, a computing device receives sensor data from one or more sensors at a wellbore that has not yet been completed for production. The data can be stimulation data and production data.

In block 304, the computing device performs a history match for stimulation and production using physics-based models. A history match can include searching a database or stored data for other wellbore data that have stimulation and production characteristics similar to those in the data from the sensor. For example, fracture models and production models can be used to identify a particular physics-based model that can be used to compare to historical data to identify wellbores with similar characteristics and access historical data about those wellbores. History matching the models with actual data can be used to reduce uncertainty in the models.

In block 306, the computing device generates inferred data using historical data determined from the history matching process. The inferred data can be generated for the entire area for the wellbore and include data over a range of parameters, such as completion parameters. The data can be inferred by modifying detected data slightly in view of the historical data from similar wellbores. For example, if an area of the wellbore has a parameter value that is similar but lower than a small amount to the historical data, the value for another parameter from the historical value can be adjusted slightly lower and applied to that same area of the wellbore under study.

In block 308, the stimulated area and production for the wellbore is predicted by the computing device using a neural network model and the inferred data that covers a range of completion parameters. The neural network model can be a trained neural network model that has been trained using data from other wellbores, including completion parameters and production data from those other wellbores. The output of the neural network model can be predicted values for parameters associated with the stimulated area and production data.

In block 310, the computing device determines completion parameters for the wellbore by applying a Bayesian optimization process on the predicted values from the neural network model for the stimulated area, production, and cost.

In block 312, the computing device outputs commands, instructions, or information about the completion parameters and the wellbore can be completed using the completion parameters. Examples of completion decisions based on completion parameters can include changing the number of holes to perforate, or location of holes to perforate, instead of perforations using open hole, changing the diameter of perforations, and fracture parameters, such as fracture width and fracture conductivity.

In one example, parameters, such as fracture length, fracture width, fracture spacing, fracturing conductivity, porosity, and reservoir permeability can be determined for optimal production for a particular wellbore. Cumulative gas production and profit maximization can be used to assess whether the parameters are optimized.

Figure 4:
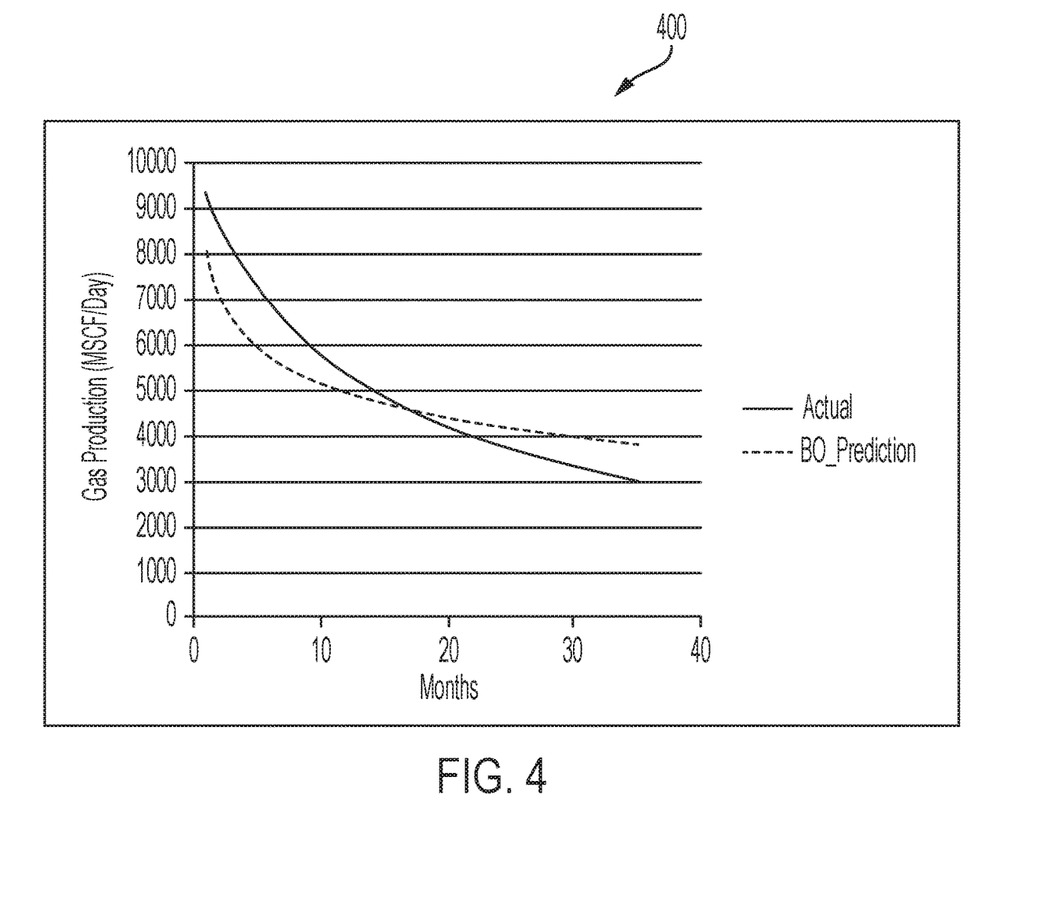
FIG. 4 is a chart of gas production over time for a well and comparing actual production to production predicted using a machine-learning process and a Bayesian optimization process according to some aspects of the present disclosure.

FIG. 4 is a chart 400 of gas production over time for a well and comparing actual production to production predicted using a machine-learning process and a Bayesian optimization process according to some aspects of the present disclosure. The chart 400 shows that on average the predicted production is similar to that of the actual production using similar or the same completion parameters.

Figure 5:
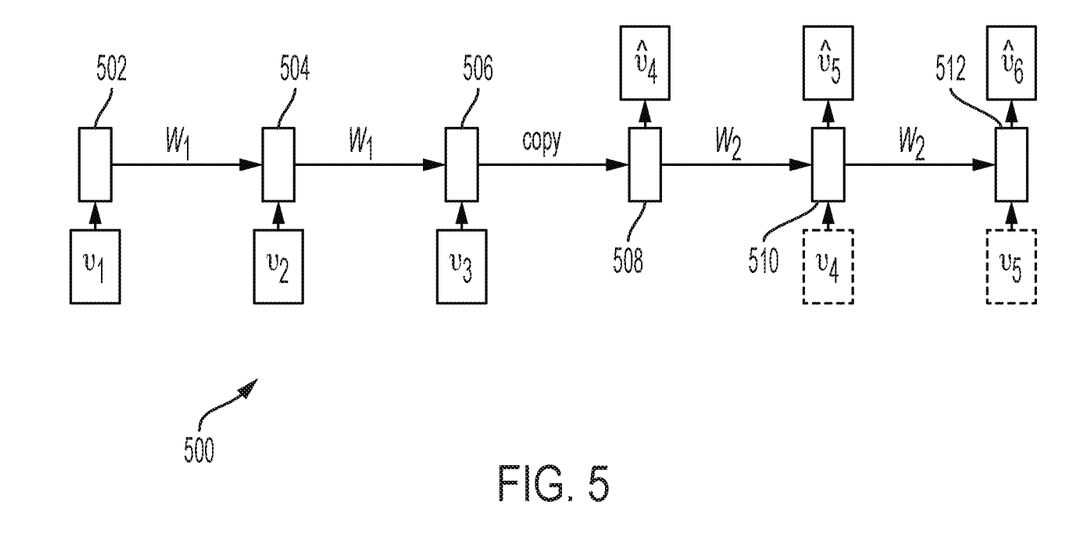
FIG. 5 is a graphical illustration of a model that can be used in a system for determining completion parameters for a wellbore according to one example of the present disclosure.

FIG. 5 is a graphical illustration of an example of a deep neural network (DNN) that is an LSTM 500 that can be used to determine completion parameters for a wellbore. LSTM 500 does not make use of convolutional layers. The model can provide for a multi-step prediction method for data provided by the surface sensor. LSTM 500 can provide a network structure for spatiotemporal data that accounts for the characteristics of the data by providing strong correlation between local neighbors. The network can be regularized by specifying a number of hidden units in the LSTM to avoid over-fitting or under-fitting the surface data. Over-fitting of the data occurs when a model fits the data almost perfectly and the model is complicated. This typically means the model is fitting the noise of the data. The model has low bias and high variance. On the contrary, under-fitting occurs when the model is too simple to fit the data hence it has high bias and low variance. The predictive model should balance between over-fitting and under-fitting the data. This can be determined by the performance of the model on the training and test data.

The network at each of points 502, 504, and 506 can be a learned representation that accounts for the characteristics of the wellbore as related to slurry placement. The network at future points in time 508, 510, and 512 is a predicted representation that takes into account these characteristics. Input and state at a time/sequence-stamp are given by the 3D tensors:

$$i_t = \sigma(W_{xi} * \chi_t + W_{hi} * \mathcal{H}_{t-1} + W_{ci} \circ C_{t-1} + b_i)$$

$$f_t = \sigma(W_{xf} * \chi_t + W_{hf} * \mathcal{H}_{t-1} + W_{cf} \circ C_{t-1} + b_f)$$

$$C_t = f_t \circ C_{t-1} + i_t \circ \tan h(W_{xc} * \chi_t + W_{hc} * \mathcal{H}_{t-1} + b_c)$$

$$o_t = \sigma(W_{xo} * \chi_t + W_{ho} * \mathcal{H}_{t-1} + W_{co} \circ C_t + b_o)$$

$$\mathcal{H}_t = o_t \circ \tan h(C_t)$$

Figure 6:
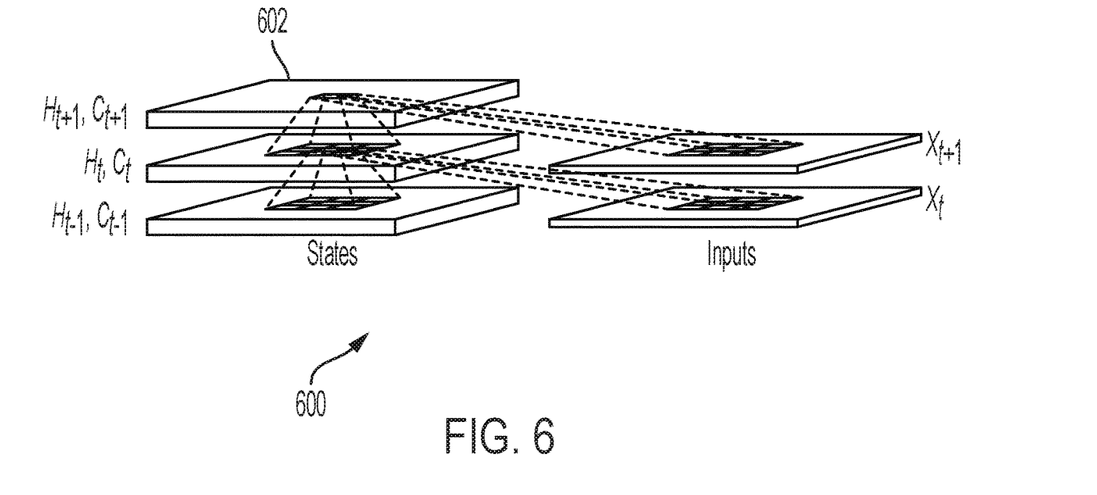
FIG. 6 is a graphical illustration of another model that can be used in a system for determining completion parameters for a wellbore according to one example of the present disclosure.
Figure 7:
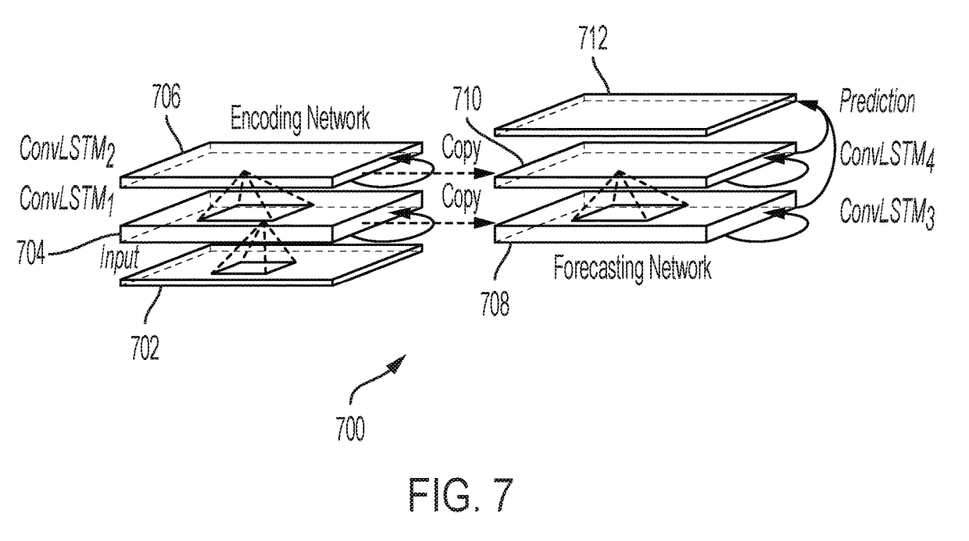
FIG. 7 is a further graphical illustration of the model of FIG. 6 being used in the system for determining completion parameters for a wellbore according to one example of the present disclosure.

FIG. 6 is a graphical illustration of a DNN that is an LSTM network 600 with convolutional layers. Convolutions are used for both input-to-state and state-to-state connections. Using convolutional layers, the final state, represented by layer 602, can have a large receptive field. FIG. 7 shows how convolutional layers 700 are used to predict wellbore completion properties. An input 702 is used in an encoding network including layers 704 and 706. A prediction network configured with the real-time surface data and including convolutional layers 708 and 710 produces a prediction, 712.

In some aspects, systems, devices, and methods for planning completion for a wellbore are provided according to one or more of the following examples:

Example 1 is a system comprising: a sensor positionable at a surface of a wellbore to detect data prior to finishing a completion stage for the wellbore; a computing device to receive data detected by the sensor, the computing device comprising: a processor; and a non-transitory computer-readable medium on which is code that is executable by the processor to perform operations, the operations comprising: performing a history match for stimulation and production using the data detected by the sensor and historical data; generating inferred data for completion parameters using the historical data identified during the history match; predicting stimulated area and production by inputting the inferred data into a neural network model; determining completion parameters for the wellbore using Bayesian optimization on the cost, stimulated area, and production from the neural network model; and outputting the completion parameters for determining completion decisions for the wellbore.

Example 2 is the system of example 1, wherein the neural network model is a deep neural network (DNN) that is trained using surface data and production data from wellbores other than the wellbore.

Example 3 is the system of example 1, wherein the data detected by the sensor includes positional and size information about fractures in the wellbore and sources for creating the fractures.

Example 4 is the system of example 1, wherein the completion decisions include a number of holes to perforate, a location of holes to perforate, and a diameter for one or more perforations.

Example 5 is the system of example 1, wherein the non-transitory computer-readable medium includes code for determining the completion parameters for the wellbore using Bayesian optimization on the cost, stimulated area, and production from the neural network model by determining completion parameters for the stimulated area and for production and cost considerations.

Example 6 is the system of example 1, wherein the inferred data includes values for parameters in addition to the parameters associated with the data from the sensor.

Example 7 is the system of example 6, wherein the non-transitory computer-readable medium includes code for generating the inferred data by adjusting parameter values based on a difference between values for other parameters included in the data from the sensor.

Example 8 is a method comprising: receiving data from a sensor at a surface of a wellbore; performing, by a computing device, a history match for simulation and production using the data detected by the sensor and historical data;

generating, by the computing device, inferred data for completion parameters using the historical data identified during the history match; predicting, by the computing device, stimulated area and production by inputting the inferred data into a neural network model; determining, by the computing device, completion parameters for the wellbore using Bayesian optimization on the cost, stimulated area, and production from the neural network model; and outputting, by the computing device, the completion parameters for determining completion decisions for the wellbore.

Example 9 is the method of example 8, wherein the neural network model is a deep neural network (DNN) that is trained using surface data and production data from wellbores other than the wellbore.

Example 10 is the method of example 8, wherein the data detected by the sensor includes positional and size information about fractures in the wellbore and sources for creating the fractures.

Example 11 is the method of example 8, wherein the completion decisions include a number of holes to perforate, a location of holes to perforate, and a diameter for one or more perforations.

Example 12 is the method of example 8, wherein determining the completion parameters for the wellbore using Bayesian optimization on the cost, stimulated area, and production from the neural network model includes determining completion parameters for the stimulated area and for production and cost considerations.

Example 13 is the method of example 8, wherein the inferred data includes values for parameters in addition to the parameters associated with the data from the sensor.

Example 14 is the method of example 13, wherein generating the inferred data includes adjusting parameter values based on a difference between values for other parameters included in the data from the sensor.

Example 15 is a non-transitory computer-readable medium that includes instructions that are executable by a processing device for causing the processing device to perform operations comprising: receiving data from a sensor at a surface of a wellbore; performing, by a computing device, a history match for simulation and production using the data detected by the sensor and historical data; generating, by the computing device, inferred data for completion parameters using the historical data identified during the history match; predicting, by the computing device, stimulated area and production by inputting the inferred data into a neural network model; determining, by the computing device, completion parameters for the wellbore using Bayesian optimization on the cost, stimulated area, and production from the neural network model; and outputting, by the computing device, the completion parameters for determining completion decisions for the wellbore.

Example 16 is the non-transitory computer-readable medium of example 15, wherein the neural network model is a deep neural network (DNN) that is trained using surface data and production data from wellbores other than the wellbore.

Example 17 is the non-transitory computer-readable medium of example 15, wherein the data detected by the sensor includes positional and size information about fractures in the wellbore and sources for creating the fractures.

Example 18 is the non-transitory computer-readable medium of example 15, wherein the completion decisions include a number of holes to perforate, a location of holes to perforate, and a diameter for one or more perforations.

Example 19 is the non-transitory computer-readable medium of example 15, wherein the non-transitory computer-readable medium includes code for determining the completion parameters for the wellbore using Bayesian optimization on the cost, stimulated area, and production from the neural network model by determining completion parameters for the stimulated area and for production and cost considerations.

Example 20 is the non-transitory computer-readable medium of example 15, wherein the inferred data includes values for parameters in addition to the parameters associated with the data from the sensor, wherein the non-transitory computer-readable medium includes code for generating the inferred data by adjusting parameter values based on a difference between values for other parameters included in the data from the sensor.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A system comprising:
a sensor positionable at a surface of a wellbore to detect data prior to finishing a completion stage for the wellbore;
a computing device to receive data detected by the sensor, the computing device comprising:
a processor; and
a non-transitory computer-readable medium on which is code that is executable by the processor to perform operations, the operations comprising:
performing a history match for stimulation and production using the data detected by the sensor and historical data;
generating inferred data for completion parameters using the historical data identified during the history match;
predicting stimulated area and production by inputting the inferred data into a neural network model;
determining completion parameters for the wellbore using Bayesian optimization on a cost, the stimulated area, and the production from the neural network model; and
outputting the completion parameters for determining completion decisions for the wellbore.

2. The system of claim 1, wherein the neural network model is a deep neural network (DNN) that is trained using surface data and production data from wellbores other than the wellbore.

3. The system of claim 1, wherein the data detected by the sensor includes positional and size information about fractures in the wellbore and sources for creating the fractures.

4. The system of claim 1, wherein the completion decisions include a number of holes to perforate, a location of holes to perforate, and a diameter for one or more perforations.

5. The system of claim 1, wherein the non-transitory computer-readable medium includes code for determining the completion parameters for the wellbore using Bayesian optimization on the cost, stimulated area, and production from the neural network model by determining completion parameters for the stimulated area and for production and cost considerations.

6. The system of claim 1, wherein the inferred data includes values for parameters in addition to the parameters associated with the data from the sensor.

7. The system of claim 6, wherein the non-transitory computer-readable medium includes code for generating the inferred data by adjusting parameter values based on a difference between values for other parameters included in the data from the sensor.

8. A method comprising:
receiving data from a sensor at a surface of a wellbore;
performing, by a computing device, a history match for simulation and production using the data detected by the sensor and historical data;
generating, by the computing device, inferred data for completion parameters using the historical data identified during the history match;
predicting, by the computing device, stimulated area and production by inputting the inferred data into a neural network model;
determining, by the computing device, completion parameters for the wellbore using Bayesian optimization on a cost, the stimulated area, and the production from the neural network model; and
outputting, by the computing device, the completion parameters for determining completion decisions for the wellbore.

9. The method of claim 8, wherein the data detected by the sensor includes positional and size information about fractures in the wellbore and sources for creating the fractures.

10. The method of claim 8, wherein the completion decisions include a number of holes to perforate, a location of holes to perforate, and a diameter for one or more perforations.

11. The method of claim 8, wherein determining the completion parameters for the wellbore using Bayesian optimization on the cost, stimulated area, and production from the neural network model includes determining completion parameters for the stimulated area and for production and cost considerations.

12. The method of claim 8, wherein the inferred data includes values for parameters in addition to the parameters associated with the data from the sensor.

13. The method of claim 12, wherein generating the inferred data includes adjusting parameter values based on a difference between values for other parameters included in the data from the sensor.

14. A non-transitory computer-readable medium that includes instructions that are executable by a processing device for causing the processing device to perform operations comprising:
receiving data from a sensor at a surface of a wellbore;
performing, by a computing device, a history match for simulation and production using the data detected by the sensor and historical data;
generating, by the computing device, inferred data for completion parameters using the historical data identified during the history match;
predicting, by the computing device, stimulated area and production by inputting the inferred data into a neural network model;
determining, by the computing device, completion parameters for the wellbore using Bayesian optimization on a cost, the stimulated area, and the production from the neural network model; and
outputting, by the computing device, the completion parameters for determining a number of holes to perforate, a location of holes to perforate, and a diameter for one or more perforations for the wellbore.

15. The non-transitory computer-readable medium of claim 14, wherein the neural network model is a deep neural network (DNN) that is trained using surface data and production data from wellbores other than the wellbore.

16. The non-transitory computer-readable medium of claim 14, wherein the data detected by the sensor includes positional and size information about fractures in the wellbore and sources for creating the fractures.

17. The non-transitory computer-readable medium of claim 14, wherein the non-transitory computer-readable medium includes code for determining the completion parameters for the wellbore using Bayesian optimization on the cost, stimulated area, and production from the neural network model by determining completion parameters for the stimulated area and for production and cost considerations.

18. The non-transitory computer-readable medium of claim 14, wherein the inferred data includes values for parameters in addition to the parameters associated with the data from the sensor, wherein the non-transitory computer-readable medium includes code for generating the inferred data by adjusting parameter values based on a difference between values for other parameters included in the data from the sensor.

19. The non-transitory computer-readable medium of claim 14, further comprising code for performing the history match using a physics-based model.

\* \* \* \* \*